United States Patent [19]

Copenhafer

[11] Patent Number: 4,729,881

[45] Date of Patent: Mar. 8, 1988

[54] HYDROMETALLURGICAL PROCESS FOR THE PRODUCTION OF BERYLLIUM

[75] Inventor: William C. Copenhafer, Yardley, Pa.

[73] Assignee: FMC Corporation, Philadelphia, Pa.

[21] Appl. No.: 942,474

[22] Filed: Dec. 16, 1986

[51] Int. Cl.$^4$ ............................................. C01F 3/02
[52] U.S. Cl. ................................. 423/123; 423/127; 423/131; 423/331; 423/332; 423/624
[58] Field of Search ............... 423/122, 123, 127, 131, 423/624, 331, 332

[56] References Cited

U.S. PATENT DOCUMENTS

| | | | |
|---|---|---|---|
| 1,998,685 | 4/1935 | Panebianco et al. | 423/127 |
| 2,298,800 | 10/1942 | McKee | 423/124 |
| 2,344,480 | 3/1944 | Adamoli | 423/127 |
| 3,369,860 | 2/1968 | Surls | 423/122 |
| 3,615,260 | 10/1971 | Hanson et al. | 75/108 |

OTHER PUBLICATIONS

Everest, D. A., et al, "Economic Assessment of Four Processes for the Production of Beryllium Hydroxide from Flotation Concentrates", Trans. Inst. Min. Metall., 74(13), 1964.
Burkin, A. R., "Pressure Leaching of Some Silicate Minerals in Alkali Solutions," Proceedings, International Minerals Processing Conference, Warminster, England, 857–862 (1960).
Higbie et al, "Beryllium: A Continuous Extractive Process," Chem. Eng. Prog., 54, No. 4, 51–54 (1958).
Griffths, Joyce, "Beryllium Minerals—Demand Strong for Miniaturisation", Industrial Minerals, Jun. 1985, 41–51.
Beryllium Extraction Process at Brush Wellman Delta, Utah Plant (flowsheet p. 47 of Griffths' article).

*Primary Examiner*—Robert L. Stoll
*Attorney, Agent, or Firm*—Patrick C. Baker; Frank Ianno

[57] ABSTRACT

Beryllium is efficiently recovered from silicate ores in a hydrometallurgical, single solvent, process which avoids the complexities, high costs and hazards of pyrolytic, fluorination and acid leach methods, by contacting the ore in a closed reactor at elevated temperature and autogenous pressure with a concentrated caustic solution and lime or lime hydrate to form a slurry containing dissolved beryllium, reducing the pressure to about one atmosphere and the temperature to below the boiling point of the caustic solution, separating by-product solids to leave a pregnant leach liquor, diluting and digesting the leach liquor to precipitate the beryllium and to leave a caustic mother liquor, and separating the beryllium. The caustic mother liquor can be recycled to the ore contacting step in a closed loop version of the process.

18 Claims, 4 Drawing Figures

HYDROMETALLURGICAL PROCESS FOR THE PRODUCTION OF BERYLLIUM

TECHNICAL FIELD

This invention relates to a process for producing beryllium by the caustic leaching of beryllium ores, and more particularly the recovery of beryllium values from silicate ores by metathesis under relatively mild reaction conditions.

BACKGROUND OF THE INVENTION

Beryllium is produced commercially in the United States principally by two processes depending on whether the ore processed contains a soft or hard mineral. Soft mineral-containing ores, such as bertrandite ($4BeO.2SiO_2.H_2O$), although not capable of being concentrated by flotation if large amounts of clay are present, are directly leachable with sulfuric acid at about 95° C. Calcium carbonate and calcium fluoride clays in the ore will consume acid to form gypsum which is discarded with the waste ore. The beryllium sulfate leach solution is separated from waste solids by thickeners to provide a leachate dilute in beryllium (about 0.1–0.2 wt % as BeO). The separated leach solution is solvent-extracted with bis(di-2-ethylhexyl) phosphoric acid (DEHPA) into kerosene. After stripping the organic phase, the solution is heated to precipitate iron and aluminum as hydroxide or basic carbonate. Further heating to 95° C. precipitates basic beryllium carbonate and continued heating at about 165° C. produces beryllium hydroxide.

Beryllium is produced from hard ores containing minerals such as beryl ($3BeO\ Al_2O_3\ 6SiO_2$) or phenacite ($2BeO\ SiO_2$) by melting an ore concentrate containing at least 10% beryllium as BeO at 1600°–1700° C., quenching in water to produce a glassy frit, heat-treating the frit at 1000° C., milling to a powder, mixing the powder with concentrated sulfuric acid, and baking at 325° C. to form a beryllium sulfate solution containing about 3.0% beryllium as BeO. About 95% of the beryllium is leached with water. The leachate is extracted into DEHPA in kerosene, and the organic phase stripped with sodium or ammonium hydroxide before stagewise hydrolysis to recover solid beryllium hydroxide. Considerable care must be taken to avoid formation of gelatinous $SiO_2$ in the water leaching step because of the difficulty of separating gelatinous material.

In one commercial process, dilute acidic beryllium sulfate leachates from soft and hard minerals are combined for the solvent extraction, stripping and hydrolysis steps to yield beryllium hydroxide. Since the combined leachate feed to solvent extraction is very dilute, processing equipment must be large and substantial amounts of raffinate waste must be purged. However, if the extraction feed were concentrated in order to reduce volume, the rate of extraction would be lowered due to increased acidity.

High temperature processes wherein beryl ores are fluorinated and water-leached or are fused with and without lime followed by cooling and sulfuric acid leaching, have been extensively investigated, reported and compared as in Everest, D. A., et al., "Economic Assessment of Four Processes for the Production of Beryllium Hydroxide from Flotation Concentrates", Trans. Inst. Min. Metall., 74 (13), 1964.

Milder reaction conditions for recovering beryllium from its ore, such as direct alkali leaching, have been reported. U.S. Pat. No. 3,615,260 describes the leaching of a beryllium ore with a 20–40 wt % caustic solution at 100°–200° C. for about 20 minutes, separating the waste solids from the high caustic leachate, and then adding lime or lime hydrate to precipitate silica but not beryllium. The product liquor is very dilute in beryllium and the beryllium is precipitated only upon further dilution and addition of lime. About 95% of the beryllium is coprecipitated with calcium hydroxide and silicates. Since the lime is added after the caustic leaching, the dissolved silica apparently lowers the equilibrium beryllium solubility such that the beryllium cannot be precipitated directly from solution. Based on the relatively mild reaction conditions of the patent, the beryllium ore treated probably contained a soft mineral such as bertrandite.

U.S. Pat. No. 2,298,800 describes a concentrated caustic leaching process for recovering beryllium from the hard minerals beryl or phenacite. The resulting slurry is diluted with water to precipitate dissolved beryllium hydroxide along with all of the waste ore. These solids are separated from the liquor and mixed again with circulating sodium carbonate/bicarbonate solution to dissolve the beryllium. After separating the waste ore from the dissolved beryllium, the solution is digested, beryllium hydroxide is precipitated and $CO_2$ is evolved. The liquor from the precipitation is recontacted with $CO_2$ and recycled to dissolve more beryllium from the caustic-decomposed ore. Additional $CO_2$ is required since residual caustic in the leached wet ore cake is neutralized by the bicarbonate when dissolving the beryllium. This process thus requires two solvents in order to produce a solution from which beryllium hydroxide can be precipitated and the lime addition is only after the caustic leach.

As discussed by A. R. Burkin, Proceedings of the 1960 International Minerals Processing Congress, Warminster, England, when a beryl ore is leached with caustic the beryllium will re-precipitate as an amorphous solid when the silica concentration becomes too high, thereby essentially shutting down the leaching operation. Apparently for this reason commercial processes have resorted to acid leaching of an alkaline fused, or partially leached, silicate-based beryllium ore such as beryl, bertrandite and phenacite.

It will be evident that the known processes for producing beryllium from its ores are limited by the nature of the ore, i.e., whether it contains a hard or soft mineral, or the processes to be effective require extraordinary provisions for dealing with problems occasioned by acid leaching, such as preventing the formation of gelatinous silicates, or the processes require high temperature roasting or fusion, resulting in high energy costs and increased risk of exposure to toxic particulates. Beryllium compounds are highly toxic, one governmental regulation limiting beryllium in air emissions to 2 micrograms per cubic meter. From the standpoint of toxicity alone, therefore, a hydrometallurgical process such as a caustic leach is highly desirable. Nevertheless, the only known caustic leach processes have not been efficient due primarily to the presence of silica in the ore either as free silica or as the bound silica present in virtually all beryllium minerals.

SUMMARY OF THE INVENTION

A hydrometallurgical process for the production of beryllium as solid beryllium hydroxide has now been found which can be efficiently practiced with all ores containing beryllium silicate minerals, both soft and hard. The process requires no fusion, high temperature roasting, fluorination or acid treatments along with their attendant problems including high energy costs, toxic particulates and interferring gelatinous silicates. Furthermore, the process can be practiced with known autoclave technology and is especially advantageous for recovery of beryllium values from phenacite deposits such as those discovered in the Northwest Territories of Canada. Still further, the process is essentially a single solvent process and can be practiced in either batch or continuous cyclical modes without liquor purge streams.

In one aspect of the invention, a hydrometallurgical process for producing solid beryllium hydroxide from an ore containing a beryllium silicate mineral, is provided wherein: (a) the ore is leached by contacting with a concentrated caustic solution and lime or lime hydrate with suitable agitation in a closed reactor at elevated temperature and autogenous pressure to form a slurry containing the beryllium hydroxide in a dissolved state together with by-product solids, (b) reducing the pressure to substantially atmospheric and maintaining the temperature below the boiling point of the caustic solution, (c) separating the by-product solids from the slurry to leave a pregnate leach liquor, (d) diluting and digesting the pregnate leach liquor to precipitate the beryllium hydroxide and to leave a mother liquor containing caustic, and (e) separating the product beryllium hydroxide.

In another aspect of the invention, the concentrations and feed rates of the beryllium ore, caustic solution and lime or lime hydrate are chosen to substantially saturate the pregnant leachate solution with respect to soluble beryllium hydroxide while converting a substantial and major proportion of the silica content (bound or unbound) of the beryllium concentrate feed to insoluble calcium and sodium silicates (followed by separation thereof), whereby in the dilution step the solubility product constant ($K_{SP}$) of beryllium hydroxide is readily exceeded and the beryllium hydroxide precipitates.

In still other aspects of the invention, the concentration and amounts of the caustic solution in the leaching step, and the temperature and pressure of the feed preparation and leaching, are selected and controlled to maximize conversion to the soluble beryllium hydroxide; the process is practiced in a cyclical manner by separating the mother liquor from the precipitation step (d), concentrating the liquor to a predetermined caustic concentration and introducing the liquor as feed to the leaching step (a); and aluminum compounds if present in the ore are removed by adding lime or lime hydrate to the mother liquor resulting from step (d).

The foregoing and other aspects, features and advantages of the invention are further detailed in the description which follows. Throughout this specification and claims, "lime" and "lime hydrate" are essentially equivalent and interchangeable terms.

DETAILED DESCRIPTION

The reactions characteristic of the invention are the following wherein equation 1 represents the combined caustic leach (metathesis) and removal of bound silica by lime of step (a), equation 2 represents removal of unbound silica (such as quartz), also during the leach of step (a), and equation 3 describes precipitation of beryllium hydroxide after separation of by-product solids in step (c) and as a result of dilution and digestion of step (d). Equations (1)–(3) represent typical compositions and stoichiometry, both of which may vary in a given case.

Leaching and Silicate Precipitation

Additional Ore Silica Precipitation During Leach

Precipitation of $Be(OH)_2$ After Silicate Filtration

More particularly, in step (a) of the process an ore containing a beryllium silicate mineral is leached by contact with both a concentrated caustic solution and lime or lime hydrate in a closed reactor at elevated temperature and autogenous pressure with suitable agitation. Suitable caustic solutions include solutions of alkali metal hydroxides such as sodium hydroxide and potassium hydroxide, and other strong bases such as ammonium hydroxide. Sodium hydroxide is preferred.

Any beryllium silicate bearing ore can be processed by the invention including hard minerals such as beryl and phenacite and soft minerals such as bertrandite, but the invention has special applicability to the processing of the hard minerals, particularly phenacite, because it avoids the pyrolytic conditions conventionally employed in the processing of such minerals. Depending on the extent of pretreatment the ore may also contain other minerals and waste materials such as silica and alumina.

Prior to leaching, the ore preferably will be ground and concentrated by flotation or other known technique to a suitably fine particle size such as about 90%–200 mesh ranging from about 6 to 150 microns and a beryllium concentration of about 6–40% as BeO. Thus, the minimum 10% beryllium (as BeO) content of the ore employed for economic processing of beryl by known commercial pyrolytic processes is not required.

A suitable elevated temperature in the leaching step is at least 200° C., the upper limit depending on reactor construction. Leaching temperature and pressure is also a function of the concentration of the caustic: a higher temperature (even boiling), and resultant increased pressure, can be tolerated for a more highly concentrated caustic, up to the limits of the equipment. Preferably, concentration of the caustic feed should be at least 40% by weight and a desirable temperature range is from about 200° C. to about 300° C., preferably at least about 250° C. when using a caustic concentration of 50 wt % NaOH.

The amounts of caustic and lime or lime hydrate are governed by the stoichiometry of the reaction. As shown in equations (1) and (2), on a molar basis the amount of caustic typically will be at least about five times the amount of beryllium mineral and lime and at least equal to the amount of silica from other sources. In a continuous process, the relative amounts of caustic and lime will, of course, be adjusted according to the amount of beryllium mineral in the feed and the most desirable steady state conditions.

More preferred leaching conditions are a temperature of about 250°-260° C., autogenous pressure of about 240-270 psi, a batch residence time of about 2-3 hours, a caustic solvent comprising 50% sodium hydroxide, a caustic solvent-to-ore (BeO) ratio of about 14:1 to 20:1, and a lime (CaO)-to-silica (total) mole ratio of at least 1:1.

Good agitation should be maintained in the reactor to facilitate the reaction and to reduce residence time. In a batch leaching reaction with good mixing a residence time of about 2-4 hours is suitable. If horizontal staged autoclave reactors are used the residence time may be longer, on the order of about 6-8 hours. Horizontal staged autoclaves are usually divided into three or four compartments each of which is mechanically agitated. The reaction mixture cascades from the feed compartment downward to each of the next compartments, thereby minimizing shortcircuiting of feed mixture to the outlets before sufficient residence time has been achieved. Vertical autoclaves operating above atmospheric pressure may also be used for the leaching step, particularly if operated continuously as further described below. Useful autoclaves of the foregoing types are described in U.S. Pat. No. 4,606,763. However, the oxygen pressurization and relatively larger first compartment of the patent are not required in the present invention.

Caustic leaching in the presence of lime or lime hydrate is a significant aspect of the invention because it has been determined that a high concentration in the leaching step of soluble beryllium cannot be achieved merely by increasing the ratio of ore concentrate to caustic solvent. It has been found that silica in the ore, whether bound or unbound, lowers the solubility of the leached beryllium compounds, thereby preventing the precipitation of $Be(OH)_2$ in the downstream dilution/digestion step (d). By simultaneously contacting the ore with both caustic and lime or lime hydrate, the lime or lime hydrate reacts with the silica, removing the bound silica as well as unbound silica (quartz), presumably as double salts in accordance with equations 1 and 2 above. The beryllium simultaneously forms a soluble salt as indicated in equation 1 above and is subsequently precipitated in separation step (c) described below. Surprisingly, although the equilibrium solubility of lime in caustic is extremely low, the rate of desilication is fast enough to allow a reasonable autoclave residence time. Even more unexpectedly, the precipitated silicate does not blind the ore by forming a barrier coating, despite the fact that its solubility in the leach solution is very low. Subsequent contact of a caustic leachate with lime is too late because the silica in the reaction mixture will already have depressed the solubility of the normally water soluble beryllium compounds produced by the leaching.

In step (b) of the process, following a suitable residence time for the leaching step (a), the reactor is vented or the pressure is otherwise reduced to about one atmosphere. The temperature is also reduced, as required, below the boiling point of the caustic solution. The product slurry is then discharged and in step (c) by-product solids are separated from the slurry to leave a pregnant liquor containing soluble beryllium compounds. Any suitable technique may be used for separating the by-product solids which include waste gangue and calcium-sodium silicates. Settling alone may not be fully effective since the particulates tend to remain suspended in the concentrated caustic. A suitable temperature range in steps (b) and (c) is about 80°-120° C., preferably about 90°-100° C., the elevated temperature being useful for efficient dilution and digestion in step (d).

However, an elevated temperature complicates separation in step (c) by conventional flocculation because most flocculants tend to decompose in concentrated caustic at such temperatures. Accordingly, by-product solid separation is more conveniently effected by means such as a rotary drum vacuum filter operating at a vacuum of about 20-25 inches of mercury wherein the filter is polypropylene, nylon or other fabric which can withstand alkaline solutions at the elevated temperature of the separation. In using this apparatus, depressurized leach slurry is poured onto the filter as vacuum is applied from inside the drum. A blade is used to scrape the solids from the filter surface. Desirably, the byproduct solids are washed to recover caustic and dissolved beryllium compounds, the latter then being added to the pregnant leach liquor.

If a horizontal or vertical stage autoclave is used for the leaching step (a), depressurization step (b) may be practiced by stagewise flashing.

In step (d) of the process, the pregnant leach liquor is diluted and digested for a suitable time and at a suitable temperature, e.g., about 90°-100° C., preferably 95°-100° C. The caustic concentration should be reduced to about 5-10% and the leach liquor digested typically for about 0.5-1.0 hour whereupon at least about 90% of the solubilized beryllium compounds will precipitate to form granular beryllium hydroxide. The prior removal of silica in steps (a) and (c) has an important effect on the precipitation of the beryllium compounds because it enables the pregnant leach liquor to be saturated or to be close to saturation in the soluble beryllium compounds, thereby increasing the amount of the beryllium compounds which are precipitated in step (d).

The precipitated beryllium hydroxide is then separated in step (e) from the granular slurry resulting from the dilution and digestion by any suitable technique such as filtration through a rotary drum vacuum filter. The beryllium hydroxide may be further purified and then calcined to beryllium oxide if desired.

Figure 1:
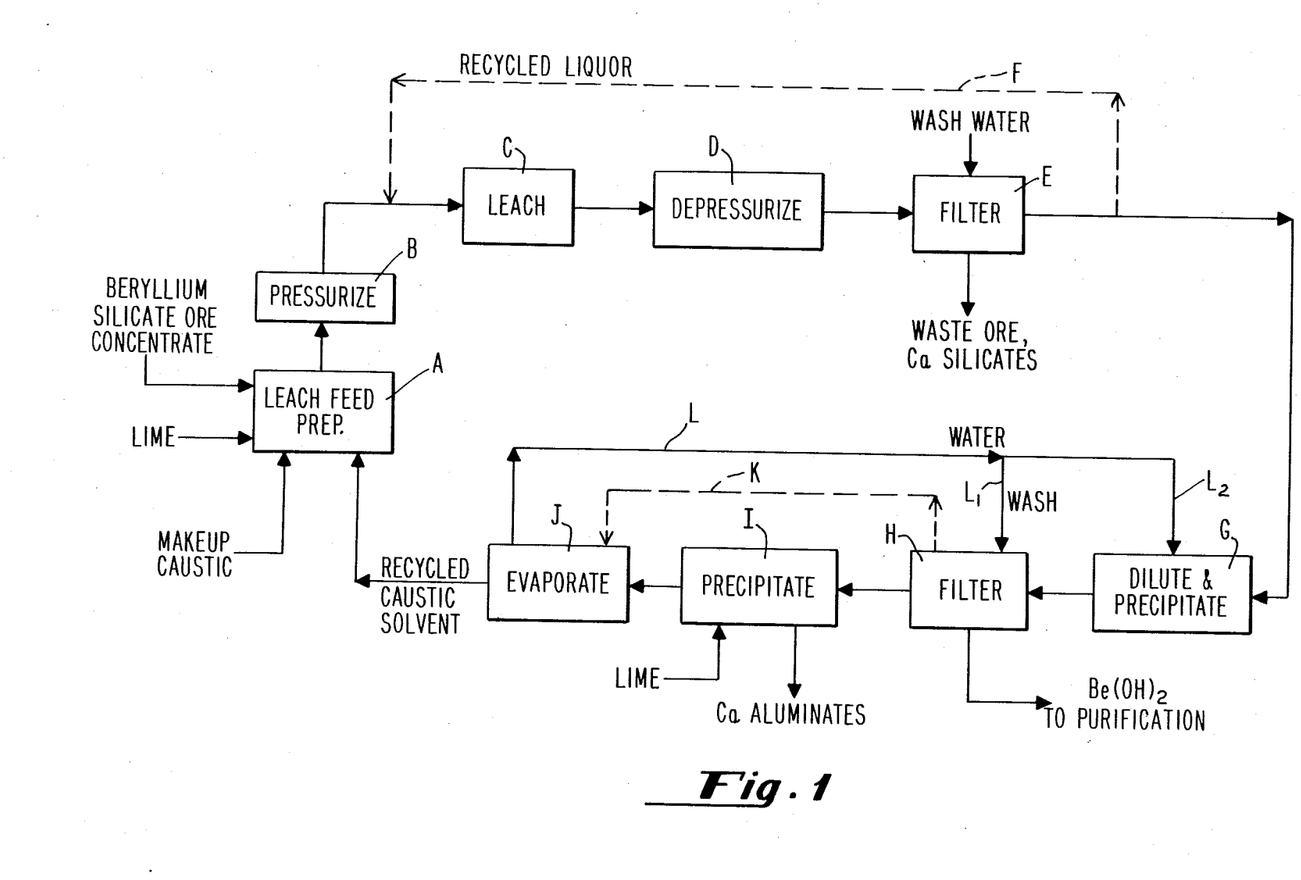
FIG. 1 is a process flow sheet of a preferred embodiment of the invention.

CONTINUOUS PROCESS—FIG. 1

While it will be evident from the foregoing that the process may be practiced batch-wise, it is preferably practiced in a continuous, cyclic, closed loop mode such as illustrated in FIG. 1. With reference thereto, a hydrometallurgical process is shown comprising unit operations A through K wherein operations F, I and K are optional.

In stage A a leach feed slurry is prepared in a suitable vessel by mixing at atmospheric pressure and ambient temperature a beryllium silicate ore concentrate (preferably ground to a particle size of about 90%–200 mesh [about 75 micron average] and dampened to reduce dust), pulverized lime or lime hydrate, recycled caustic solvent and make-up caustic as needed. Other lime or lime hydrate particle sizes may be used in the continuous or batch processes of the invention, including small particle sizes, e.g., 2–100 microns, and pebble sized material, e.g., up to about 3/8 inch. The mixture may be heated somewhat to facilitate formation of a slurry, but no higher than the atmospheric pressure boiling point of the caustic solvent. The feed slurry is then pressurized (stage B) to a pressure somewhat higher than the desired steady-state pressure in the leaching stage C and transferred to a closed pressure vessel in stage C for leaching of the beryllium from the ore. The latter vessel may comprise a horizontally or vertically staged autoclave as described above. The reaction mixture is heated in the stage C autoclave to a temperature dependent on the concentration of the caustic and the pressure limits of the vessel, such range being about 200° C. to about 300° C. for a caustic concentration of at least 40 wt %. The preferred temperature is about 250° C. for a caustic feed concentration of about 50 wt %. Liquor from the filtration step (E) optionally may be recycled via line F to the leach feed to stage C in predetermined amounts and at a predetermined rate depending on the efficiency of the leach, as an aid in subsequently achieving as close to saturation as possible of the filtrate from stage E with soluble beryllium compounds while maintaining a suitable solids concentration.

After a suitable residence time, e.g., about 2–7 hours, the autoclave is depressurized as indicated in stage D, via stagewise flashing or otherwise, and the product slurry is sent to filtration in stage E. The filtration is aided by wash water and by any additives and conditions well known in the art. After removal of waste ore and other solids including silicate salts, the filtrate is transported to stage G wherein it is diluted for precipitation of beryllium hydroxide. The dilution should be sufficient to reduce the caustic concentration in the slurry below 35%, at which point the soluble beryllium compounds are converted from polymeric to monomeric species and precipitated. Preferably, the slurry is diluted to 5–10% caustic and is digested for at least about one hour at about 90°–100° C. Under these conditions at least 90% of the beryllium will precipitate. The precipitation in stage G is facilitated by recycling water via operative lines L and $L_2$ from a subsequent evaporation stage J.

Precipitated solids are transferred to filter stage H wherein beryllium hydroxide is removed and sent to further purification. Filtrate from stage H if it contains aluminum compounds preferably is sent to a precipitation stage I wherein the addition of lime will precipitate the aluminum as calcium aluminates. Aluminum, similar to silica, will depress the solubility of beryllium compounds during caustic leach, and must be removed (if present in the filtrate from the dilution and precipitation stage G). If the aluminum is not removed, recycling of a caustic solvent to the leach feed containing substantial amounts of aluminum compounds could shut down the process. However, the filtrate containing dilute caustic (about 5–10 wt %) should only be treated in minor amounts because of the tendency of soluble beryllium hydroxide remaining in the filtrate to coprecipitate in stage I as a calcium-beryllium hydroxide double salt. Of course, if the filtrate from stage H contains little or no dissolved aluminum compounds, it may be sent as indicated by operative line K to evaporation stage J wherein water is removed for recycling as wash water via operative line $L_1$ to filtration stage H and/or as dilution water to stage G via $L_2$. The resulting concentrated caustic is then recycled to leach feed preparation stage A for continuation of the cycle.

The following non-limiting examples further illustrate the invention. In these examples and throughout the specification and claims, all parts and percentages are by weight and all temperatures are centigrade unless otherwise indicated. Example I, while not describing lime addition, shows the relationship of other process varibles, particularlly the effect of silica on caustic leaching, thus defining the problem solved by the invention as specifically illustrated in Examples II to IV.

EXAMPLE I

To a 500 ml cylindrical rotating nickel autoclave was added a concentrated caustic (NaOH) solvent and a phenacite concentrate obtained by flotation of an ore mined from the E-zone deposit, Thor Lake, Northwest Territories, Canada, assaying 2–3% BeO. Analysis of the concentrate (A) yielded the following composition:

| | |
|---|---|
| BeO | 25.2% |
| $SiO_2$ | 58.2 |
| $Al_2O_3$ | 0.6% |
| $Fe_2O_3$ | 5.0% |
| CaO | 7.2% |
| MgO | 0.8% |

The reactor was closed and heated to 150°–250° C. with an open flame and the temperature was maintained as the cylinder was rotated at about 20 rpm. After leaching at the desired temperature and autogenous pressure for 1–7 hours, the flame was removed and the reactor was cooled in a pan of water to about 70° C. The reactor was then opened and the reaction mixture vacuum filtered through a commercial polypropylene cloth (EIMCO 901F) on a Buchner funnel. The reactor was rinsed with water and the filtered, waste ore washed with three 50 ml portions of water. The wash liquor and mother liquor were combined and analyzed for soluble beryllium to yield the leach efficiency.

Figure 2:
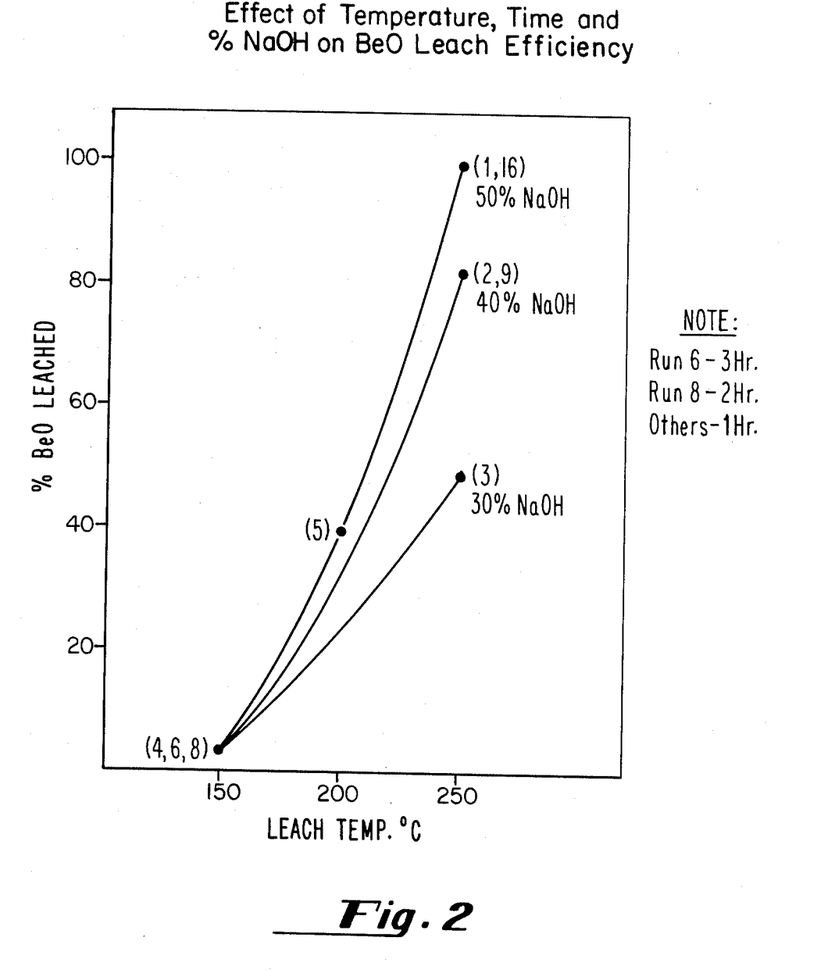
FIG. 2 is a plot illustrating the effect of temperature, time and caustic concentration on beryllium (as BeO) leach efficiency.
Figure 3:
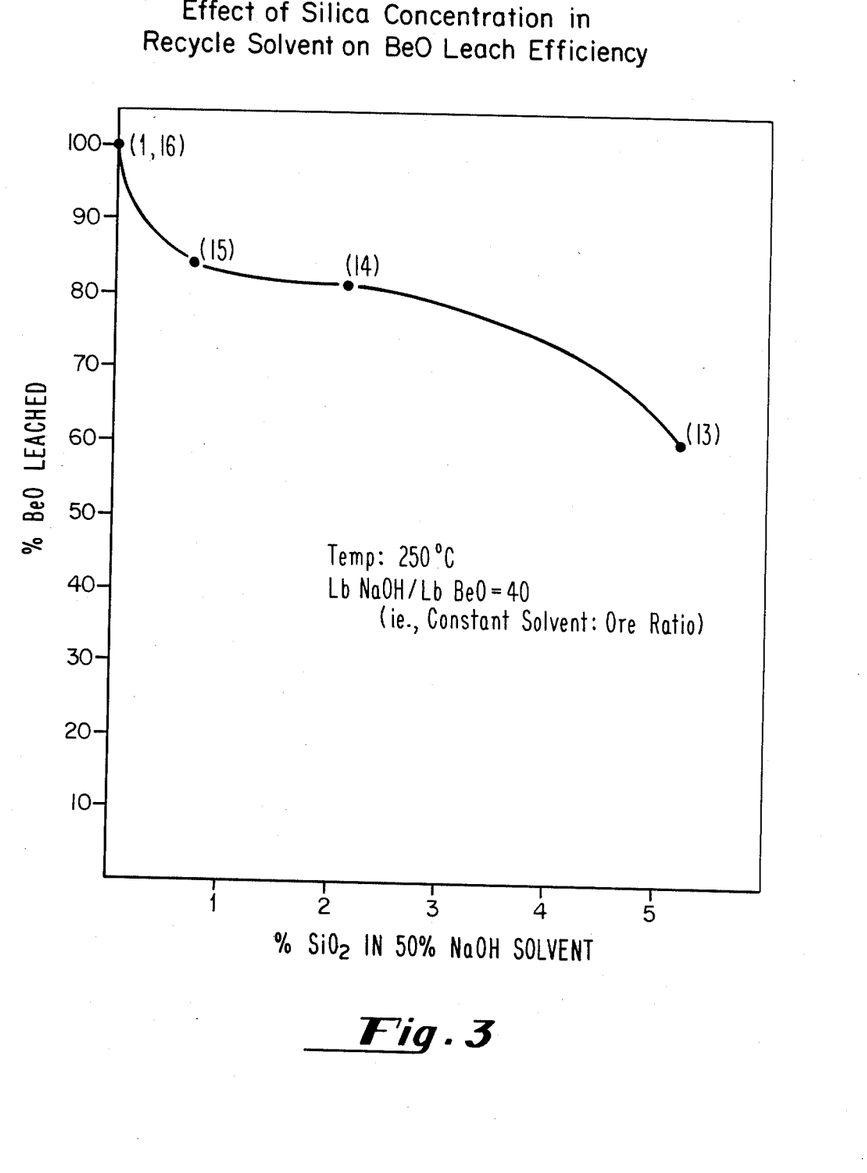
FIG. 3 is a plot illustrating the effect of silica concentration in recycled caustic solvent, described in the embodiment of FIG. 1, on beryllium (as BeO) leach efficiency.

Appended Table I and FIGS. 2 and 3 describe the results of 18 runs for various temperatures, concentrations of caustic and amount of caustic solvent. No lime was added to the ore samples. Runs 1–3 and 16 show that beryllium leach efficiency at 250° C. decreases sharply with decreasing caustic concentration. Runs 4–9 show the combined effect of temperature, caustic concentration and time on leach efficiency, specifically that leach rate drops off rapidly with decreasing temperature (runs 4 and 5), contributing to decreased leaching attributable to lower caustic concentration (runs 6 and 8, 7 and 9). Increased residence time under such conditions does not improve the leach (run 18). The results thus demonstrate that preferred leach conditions are a caustic feed concentration of at least 40% and a temperature in excess of 200° C., more preferably at least about 250° C. FIG. 2 summarizes the results of these runs, the parenthetical numerals at the data points representing the runs.

Runs 10-12 report the effect of varying the ore-to-solvent ratio (where the solvent is 50% NaOH) while maintaining the temperature constant at 250° C. An important objective in beryllium ore caustic leaching is to generate as high a concentration of BeO in the leachate as possible in order to maximize precipitation of Be(OH)$_2$ in the downstream dilution step of the process. However, it is also desirable to minimize the ore-to-solvent ratio in order to economize on liquor being circulated. Consequently, the leachate should be as close to saturation in beryllium as possible. Runs 10-12 show that decreasing the ratio of caustic in the solvent to BeO in the ore concentrate results in virtually no change in the equilibrium Be(OH)$_2$ concentration. This is believed due primarily to silica leached from the phenacite concentrate (as further supported by runs 13-15) and indicates that the overall process (leaching through precipitation of Be(OH)$_2$ by dilution) is solubility-limited by silica.

Runs 13 to 15 show the impact that dissolved silica in recycled caustic solvent could have on a closed loop leaching operation such as illustrated in FIG. 1. Except for the presence of Na$_2$SiO$_3$ in the caustic solvent, the conditions of these runs were the same as those of runs 1 and 16. The results are plotted in FIG. 3 and show that silica lowered the beryllium leach efficiency such that at 5.2% SiO$_2$ in the 50% NaOH, only 61% of the beryllium was dissolved from the concentrate as (run 13). Dissolved silica lowers the equilibrium beryllium saturation concentration and therefore must be removed as much as possible during or prior to the leaching step so that the leachate is saturated or close to saturation in beryllium, thereby maximizing the amount of soluble beryllium available for precipitation in the dilution step.

In run 17, SiO$_2$ and Al$_2$O$_3$ were added to the caustic solvent, also to simulate a caustic recycle solvent (as in FIG. 1), and to determine the impact of these agents on the leaching of beryllium from the ore. The results show that despite the conditions found to be favorable for other runs of Table I, the leach efficiency drastically decreased to 34%. Since run 14 with 2% SiO$_2$ yielded a leach efficiency of 82%, most of the difference can be attributed to the presence of the aluminum. Clearly, aluminum should not be allowed to build up in a cyclic process such as that of FIG. 1, particularly since aluminum is generally more soluble than beryllium on a molar basis. The aluminum, if present, can be removed by lime addition, as shown in stage I of FIG. 1, described above, and as illustrated in Example IV.

EXAMPLE II

Because the work described in Example I demonstrated that it was important to remove silica at some point during the processing of beryllium silicate-containing ore to solid Be(OH)$_2$, a study was made of the addition of lime (CaO) to leachate from the runs of Example I containing dissolved Be(OH)$_2$. Although U.S. Pat. No. 3,615,260 indicates that silica can be removed from solutions dilute in Be(OH)$_2$ (about 2 g BeO/l ) and concentrated in caustic without coprecipitating beryllium, and Mercer et al, J. Inorg. Nucl. Chem., 28,61 (1966) show that 95% of beryllium is precipitated from a 7.5 wt % caustic solution initially containing about 17 g BeO/l, it was unknown whether the results would be the same if both the caustic and Be(OH)$_2$ were more concentrated in the solution.

Table II gives the results of desilicating leachate liquor from runs of Example I wherein the initial liquor was a mixture from runs 1 and 16. Table III reports the results of attempts to precipitate Be(OH)$_2$ from the mother liquors of the runs of Table II. In the desilication work of Table II the leachate was refluxed for one hour before filtering and analysis. The desilicated feed mother liquors of Table III were diluted and then digested for one hour at 95° C.

Table II shows that when using CaO:SiO$_2$ mole ratios of 0.7 and 1.4, about 64% of the dissolved silica was removed in run A, while the higher lime addition in run B yielded about 82% of the silica precipitated with the lime. In both runs, very little, if any, of the BeO values were lost with the solids. The attempts to precipitate the Be(OH)$_2$ from the desilicated mother liquors of runs A and B of Table II were, as shown in Table III, unsuccessful. Essentially none of the beryllium was precipitated from the 7% NaOH solutions of runs A and B. Upon dilution of the concentrated caustic, the solubilized beryllium is also diluted by the same factor, and if its concentration is too low, it will not drop from solution upon digestion. In addition, it is critical to remove silica during the leaching step (rather than after leaching as in U.S. Pat. No. 2,298,800 and 3,615,260) to avoid lowering the beryllium concentration in the leachate by dilution and lime addition to the leachate, resulting in coprecipitation with silica, as in U.S. Pat. No. 2,298,800. Run 28 described below, when considered with the results of Tables I-III and as summarized in FIG. 4, further demonstrates the significance of the presence of lime or lime hydrate during the leaching step of the invention.

EXAMPLE III

Appended Table IV reports conditions and results for a series of caustic leaching runs made (except runs 25 and 28) in a 300 ml stirred Parr reactor equipped with a monel cup insert and dip tube permitting the transfer of samples under pressure. Autogenous pressures could be measured. For example, when the concentration of the caustic feed was 50% and the temperature of the reactor was 250° C., the system pressure was 245 psi. This is essentially the equilibrium vapor pressure of a 50% NaOH solution at 250° C. Runs 25 and 28 used the rotating nickel reactor of Example I but the ore concentrate of all of the runs was a lower grade phenacite material comprising 17.2% BeO and 65.9% SiO$_2$ identified as concentrate B.

Although runs 23, 24 and 29 were sampled at 250° C. and the residence time was short, the conditions of runs 23, 24, 26 and 29 are sufficiently close to support the conclusion that the addition of the lime during leaching substantially increases the percent beryllium dissolved (converted to soluble Be(OH)$_2$).

Run 28 is of special interest because it provides a useful comparison with runs 1-18 of Example I and the runs of Example II (Table III particularly), all of these runs being in the same reactor and at the same or proximate conditions, differing primarily in no added lime (runs 1-18), lime added after leaching (runs A and B of Tables II and III) and lime added during leaching (run 28). Run 28 is representative of preferred conditions of the invention. It is evident from run 28 that lime addition during leaching with concentrated caustic at elevated temperature and autogenous pressure substantially enhances the dissolution of beryllium, thus providing the higher dissolved beryllium concentrations necessary for downstream precipitation of Be(OH)$_2$ via dilution and digestion. Because of sampling and other difficulties in the remaining runs of Table IV, the results are not as persuasive as run 28 from a comparison standpoint.

EXAMPLE IV

Caustic leaching of several different beryllium silicate ore concentrates was effected with the addition of lime in a rocking nickel autoclave at autogenous pressure and under the conditions and with the results reported in Table V appended. The ore concentrates (C, D, E) had the following % compositions.

|  | C (phenacite)[1] | D (beryl) | E (phenacite)[2] |
| --- | --- | --- | --- |
| BeO | 21.7 | 10.0 | 13.6 |
| SiO$_2$ | 44.2 | 69.1 | 39.2 |
| Al$_2$O$_3$ | 1.9 | 22.3 | 2.13 |
| Fe$_2$O$_3$ | 9.4 | 0.34 | 9.6 |

[1]Thor Lake, NWT, Canada - E zone
[2]Thor Lake, NWT, Canada - D zone

The leachates of runs 35, 36, 43, and 45 were subjected to dilution and digestion substantially as described in Example II in order to precipitate Be(OH)$_2$. The results are summarized in Table VI, including, for comparison, the result from the leachate of composite runs 1, 16 (Table III) of Example II.

Run 35 used a ratio of NaOH:BeO of only 14.5, the amount of solvent being chosen to yield a nearly saturated leachate if 100% of the beryllium was leached. As shown in Table V, 90% of the beryllium was dissolved, yielding a rinsed leachate composition of 2.7% BeO/36.8% NaOH. All rinsed leachates were analyzed for % NaOH in order to provide BeO concentrations corresponding to a particular caustic concentration. The waste ore from this run was repulped in 35% NaOH at about 100° C. for one hour before filtering and washing. Since run 36 used exactly the same conditions as run 35 except the waste ore was not repulped, and only 71% of the BeO was leached from the ore, the difference in total leach efficiencies is attributed to the repulp used in run 35.

Table VI shows that a 94% pure Be(OH)$_2$ precipitate can be made by diluting the leachate of run 35 to 5.3% NaOH and digesting for one hour. The Be(OH)$_2$ precipitates made by digesting at 95° C. or higher are granular and settle quickly in the 5% NaOH. Based on the liquid BeO analysis before and after digestion, 91% of the leached beryllium was precipitated as Be(OH)$_2$.

The run 36 leachate at 1.82% BeO/30.8% NaOH (after rinsing from the reactor) was diluted to three different caustic concentrations and digested for one and two hours to verify the expected drop-off of Be(OH)$_2$ yield with increasing percent NaOH. Ninety-one percent of the beryllium was precipitated when diluted to 5% NaOH and digested for one hour; the amount did not increase after two hours. Diluting the run 36 leachate to 10% NaOH resulted in precipitating only 63% of the beryllium after one and two hours. Both of the intermediate products from the 5 and 10% NaOH digestions were about 94% pure Be(OH)$_2$. Silica (1.6 and 0.8% SiO$_2$, respectively) and iron (3.9 and 4.4% Fe$_2$O$_3$, respectively) were the other impurities from the 5 and 10% NaOH digestions. Most of the iron is probably from the fines which came through the polypropylene used to filter the waste ore from the leachate. Dilution of the run 36 leachate from 1.8% BeO/30.8% NaOH to 0.89% BeO/15.7% NaOH resulted in virtually no Be(OH)$_2$ precipitation after digesting two hours.

Run 37 used a higher caustic BeO ratio at 16.3 in order to produce a slightly less saturated BeO solution and to help insure a high leach efficiency for the two hour residence time. However, 74% of the phenacite beryllium dissolved.

Forty percent caustic was used in run 38 at an ore:solvent ratio such that if all of the beryllium was leached, the BeO concentration would have been about 5.2% BeO in 38% NaOH. This is below the equilibrium solubility for the system and would have yielded a substantial improvement in creating a concentrated BeO solution in 38% NaOH solution and reducing the amount of water evaporated to generate the leach caustic solvent. After 2.5 hours at 250° C., 33% of the phenacite concentrate's beryllium was leached into 40% caustic. Accordingly, a caustic feed of higher concentration is preferred.

Forty percent caustic was also used in run 40 at a NaOH BeO ratio of 13.0 (vs. 7.6 for run 38). If all of the BeO were leached in this run, a 3.1% BeO solution in about 38% NaOH would have been generated which would have been an improvement over the same BeO concentration resulting from leaching with 50% NaOH. After leaching for 2.5 hours at 250° C., 48% of the ore BeO content was dissolved. This result also indicates that a caustic feed of higher concentration is preferred.

Runs 39 and 41 used a 50% caustic solvent with 1.6 and 3.8% Al$_2$O$_3$, respectively. As discussed previously (i.e., run 17 which had 2% SiO$_2$ and 2% Al$_2$O$_3$ in the 50% NaOH), alumina in a recycled caustic solvent appears to lower the leach efficiency. The results of these two runs yielded 66% BeO leached for run 39 and 61% leached for 41, indicating that alumina does have an adverse effect.

Runs 43-45 used a residence time of three hours and a slightly higher leaching temperature of 260° C. Run 43 yielded 93% of the phenacite concentrate's beryllium which had dissolved. The beryllium accountability among the waste ore, leachate, and wash liquor was 100%. Dilution of this pregnant leachate to 5% NaOH and digestion for one hour at 95° C. precipitated 95% of the leached beryllium, for an overall process efficiency of 88% from ore concentrate to intermediate Be(OH)$_2$ product. The Be(OH)$_2$ precipitate was 94.6% pure, with the balance of the impurities being iron and silica, as in prior runs. Runs 43 and 45 thus identify preferred conditions of the process of the invention.

In run 44 only 31% of the beryllium was leached into 50% NaOH after three hours at 260° C. Part of the reason for this low efficiency, in addition to lowering the equilibrium beryllium solubility in caustic by the presence of aluminum, may be the significantly larger particle size of the beryl concentrate, ranging between 10 to 550 microns as measured microscopically. The floated phenacite concentrate particle size distributions of runs 35-43 ranged from 6 to 150 microns with an average of about 32 microns, as determined by coulter counter analysis.

Figure 4:
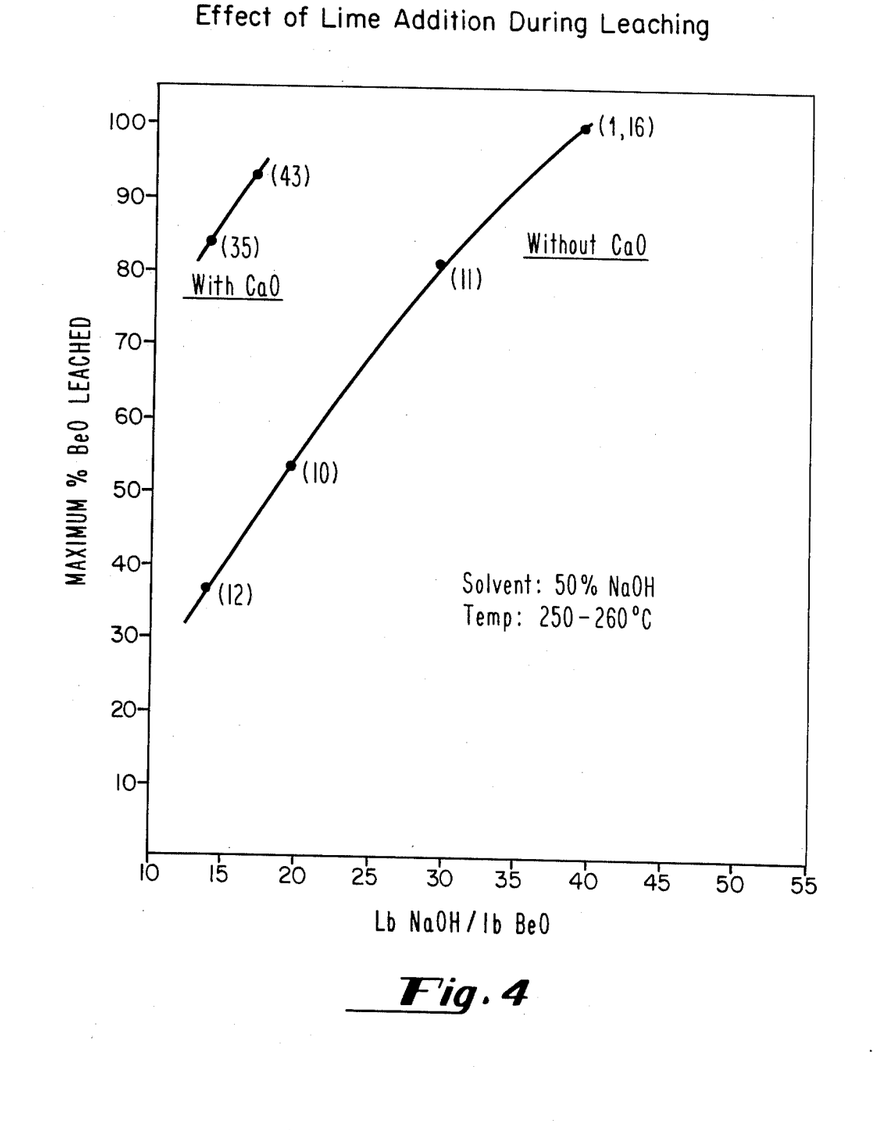
FIG. 4 is a plot showing the effect of lime addition during caustic leaching as contrasted with caustic leaching without lime addition.

FIG. 4 summarizes and compares results of runs from Examples I and IV, the numbers in parentheses representing the runs, at preferred conditions of solvent caustic concentration and temperature. It is evident that addition of lime during the leaching (runs 35 and 43) substantially reduced the amount of caustic per unit weight of beryllium in the ore required to leach approximately equivalent amounts of beryllium. The removal of silica during the leaching step therefore provides an eminently efficient hydrometallurgical process for the recovery of beryllium from its ores.

TABLE I

CAUSTIC LEACHING IN ROTATING AUTOCLAVE

| Run | Solvent | Temp., °C. | Leach Time, Hr. | Ore Concentrate g. | Caustic Solvent g. | g. NaOH/ g. BeO in Ore Conc. | Filtrate + Wash, ml | Be in Leachate, g/l BeO | Be Leached, % BeO |
|---|---|---|---|---|---|---|---|---|---|
| 1 | 50% NaOH | 250 | 1 | 10 | 200 | 39.7 | 137 | 19.9 | 108 |
| 2 | 40% NaOH | 250 | 1 | 10 | 200 | 31.7 | 142 | 15.2 | 86 |
| 3 | 30% NaOH | 250 | 1 | 10 | 200 | 23.8 | 152 | 8.1 | 49 |
| 4 | 50% NaOH | 150 | 1 | 10 | 200 | 39.7 | 133 | 0.49 | 3 |
| 5 | 50% NaOH | 200 | 1 | 10 | 200 | 39.7 | 145 | 6.8 | 39 |
| 6 | 30% NaOH | 150 | 3 | 10 | 200 | 23.8 | 176 | 0.35 | 3 |
| 7 | 30% NaOH | 250 | 3 | 10 | 200 | 23.8 | 168 | 9.8 | 65 |
| 8 | 40% NaOH | 150 | 2 | 10 | 200 | 31.7 | 166 | 0.39 | 3 |
| 9 | 40% NaOH | 250 | 2 | 10 | 200 | 31.7 | 151 | 13.7 | 82 |
| 10 | 50% NaOH | 250 | 1 | 10 | 100 | 19.8 | 64 | 21.0 | 53 |
| 11 | 50% NaOH | 250 | 1 | 10 | 150 | 29.8 | 114 | 17.8 | 81 |
| 12 | 50% NaOH | 250 | 1 | 10 | 140 | 13.9 | 110 | 16.9 | 37 |
| 13 | 50% NaOH 5.2% SiO$_2$ | 250 | 1 | 10 | 200 | 39.7 | 124 | 12.4 | 61 |
| 14 | 50% NaOH 2.1% SiO$_2$ | 250 | 1 | 10 | 200 | 39.7 | 127 | 16.3 | 82 |
| 15 | 50% NaOH 0.7% SiO$_2$ | 250 | 1 | 10 | 200 | 39.7 | 130 | 16.4 | 84 |
| 16 | 50% NaOH | 250 | 1 | 10 | 200 | 39.7 | 189 | 14.5 | 108 |
| 17 | 50% NaOH 2.1% SiO$_2$ 2% Al$_2$O$_3$ | | 1 | 10 | 200 | 39.7 | 135 | 6.4 | 34 |
| 18 | 30% NaOH | 100 | 7 | 10 | 200 | 23.8 | 168 | 0.26 | 2 |

TABLE II

DESILICATION OF PHENACITE LEACHATE

| | Run A | Run B |
|---|---|---|
| SiO$_2$ Precipitation Data | | |
| Initial Liquor* | | |
| Initial Vol., ml | 80 | 80 |
| g BeO/l | 14.9 | 14.9 |
| g SiO$_2$/l | 31.2 | 31.2 |
| g Ca(OH)$_2$ added | 2.0 | 4.3 |
| Ca: SiO$_2$ mole ratio | 0.65 | 1.4 |
| % NaOH | ca. 45 | ca. 45 |
| Mother Liquor | | |
| Vol, ml | 66 | 74 |
| g BeO/l | 15.2 | 16.9 |
| g SiO$_2$/l | 14.2 | 7.0 |
| Air-dried Residue | | |
| Wt, g | 4.41 | 7.71 |
| % BeO | 0.48 | 0.44 |
| % SiO$_2$ | 37.3 | 31.0 |
| Results | | |
| % Precipitated | | |
| BeO | 2.0 | 2.6 |
| SiO$_2$ | 63.7 | 82.2 |

*Composite leachate from runs 1 and 16 of Example I.

TABLE III

ATTEMPTED PRECIPITATION OF Be(OH)$_2$ FROM PHENACITE LEACHATE

| | Run A | Run B |
|---|---|---|
| Precipitation Data | | |
| Desilicated Feed (Mother Liquors of Table II) | | |
| Volume, ml | 50 | 40 |
| g BeO/l | 15.2 | 16.9 |
| g SiO$_2$/l | 14.2 | 7.0 |
| Mother Liquor After Dilution with water, then digestion at ca. 100° C. | | |
| Volume, ml | 500 | 400 |
| Approx. % NaOH | 7 | 7 |
| g BeO/l | 1.33 | 1.71 |
| g SiO$_2$/l | 1.34 | 0.70 |
| Wet Residue Wt, g | Negligible | Negligible |
| Results | | |
| % Precipitated | | |
| BeO | 5.9 | 3.6 |
| SiO$_2$ | −1.5 | 5.0 |

TABLE IV

LEACHING OF PHENACITE CONCENTRATE

| Run: | | 22 | 23 | 24 | 25 | 26 | 27 | 28 | 29 | 30 |
|---|---|---|---|---|---|---|---|---|---|---|
| | | I. Concentrations: | | | | | | | | |
| Be Conc. feed, ID: | | A | B | B | B | B | B | B | B | B |
| Weight | : | 10.0 | 25 | 15.2 | 20.1 | 14.9 | 46.3 | 50 | 25 | 40 |
| 50% NaOH, g | | 200 | 200 | 120 | 400 | 120 | 234 | 400 | 200 | 200 |
| gNaOH/gBeO | | 39.7 | 23.2 | 22.9 | 57.8 | 23.4 | 14.7 | 23.2 | 23.2 | 14.5 |
| Ca(OH)$_2$, g | | 0 | 0 | 14.2 | 0 | 14.2 | 0 | 47.5 | 0 | 0 |
| Ca:SiO$_2$ mole ratio | | 0 | 0 | 1.2 | 0 | 1.2 | 0 | 1.2 | 0 | 0 |
| Leach Temperature, °C., | #1: | 250 | 250 | 250 | 250 | 250 | 150 | 250 | 118 | 126 |
| | #2: | — | — | — | — | — | 200 | — | 205 | 250 |
| | #3: | — | — | — | — | — | 250 | — | 250 | 200 |
| | #4: | — | — | — | — | — | — | — | — | 150 |
| Time, hours | : | 1 | 1 | 1 | 1 | 2.2 | 1, each T | 1 | 1 | 1, each T |
| Samples, Temp. (T), °C. | #1: | 250 | 250 | 250 | 25 | 250 | 150 | 25 | 250 | — |
| | #2: | — | 150 | 200 | — | — | 200 | — | — | 250 |
| | #3: | — | — | 150 | — | — | 250 | — | — | 200 |

TABLE IV-continued

LEACHING OF PHENACITE CONCENTRATE

| Run: | | 22 | 23 | 24 | 25 | 26 | 27 | 28 | 29 | 30 |
|---|---|---|---|---|---|---|---|---|---|---|
| | #4: | — | — | — | — | — | — | — | — | 150 |
| II. Results: | | | | | | | | | | |
| Final Extraction, % | BeO: | 60 | 23 | 68 | 91 | 67 | 23 | 86 | 33 | 39 |
| | SiO$_2$: | 32 | 47 | 7.0 | — | — | — | — | — | 9.6 |
| Product Assays: | | | | | | | | | | |
| Filtrates: | | | | | | | | | | |
| #1, BeO, g/l: | | | 2.56 | 1.3 | 19.3 | 12.8 | 22.5 | 1.4 | 28.9 | 15.2 | — |
| SiO$_2$, g/l: | | | 18.6 | 10.3 | 11.2 | | | | | | |
| #2, BeO, g/l: | | | | 7.6 | 23.8 | | | 4.3 | | | 11.7 |

TABLE V

CAUSTIC LEACHING IN ROCKING AUTOCLAVE

| Run | Solvent Composition | T, °C. | Time at Temp, Hr | Ore Concentrate, g. | Ore ID | Caustic Solvent, g | g NaOH Per g BeO | CaO, g (1) | Rinsed Filtrate % BeO | Rinsed Filtrate % NaOH | % Be Leached | % Be Accountable |
|---|---|---|---|---|---|---|---|---|---|---|---|---|
| 35 | 50% NaOH | 250 | 2.0 | 40.9 | C | 260 | 14.6 | 25.1 | 2.72 | 36.8 | 90 (2) | 105 |
| 36 | 50% NaOH | 250 | 2.0 | 40.9 | C | 260 | 14.6 | 25.1 | 1.82 | 30.8 | 71 | 103 |
| 37 | 50% NaOH | 250 | 2.0 | 36.8 | C | 260 | 16.3 | 22.6 | 1.65 | 31.3 | 74 | 95 |
| 38 | 40% NaOH | 250 | 2.5 | 50.9 | C | 210 | 7.6 | 31.3 | 1.06 | 19.1 | 33 | 100 |
| 39 | 50% NaOH, 1.6% Al$_2$O$_3$ | 250 | 2.0 | 29.7 | C | 210 | 16.3 | 20.6 | 1.32 | 27.4 | 66 | 97 |
| 40 | 40% NaOH | 250 | 2.5 | 29.7 | C | 210 | 13.0 | 18.3 | 0.98 | 23.3 | 48 | 92 |
| 41 | 50% NaOH, 3.8% Al$_2$O$_3$ | 250 | 2.0 | 29.7 | C | 210 | 16.3 | 24.5 | 1.33 | 29.7 | 61 | 100 |
| 42 | 50% NaOH | 250 | 2.0 | 26.4 | C | 210 | 18.3 | 16.0 | 1.27 | 30.3 | 66 | 102 |
| 43 | 50% NaOH | 260 | 3.0 | 36.8 | C | 260 | 16.3 | 22.6 | 2.05 | 31.1 | 93 | 100 |
| 44 | 50% NaOH | 260 | 3.0 | 36.8 | D | 260 | 34.3 | 22.6 | 0.32 | 30.3 | 31 | 100 |
| 45 | 50% NaOH | 260 | 3.0 | 47.4 | E | 210 | 16.3 | 33.0 | 1.24 | 23.7 | 80 | 100 |

(1) CAO: SiO$_2$ mole ratio = 1.5 for runs 35–43, 1.0 for run 44, and 1.9 for run 45.
(2) Includes 6% from caustic repulp for run 35.

TABLE VI

BERYLLIUM HYDROXIDE PRECIPITATION

| Leachate Origin | Digestion % NaOH | Initial BeO Concentration g BeO/l | Initial BeO Concentration wt % BeO | Digestion Time, Hr. | Final BeO Concentration g BeO/l | Final BeO Concentration wt % BeO | Percent Be Precipitated | Dried Product Analysis % Be(OH)$_2$ | Dried Product Analysis % SiO$_2$ | Dried Product Analysis ppm Al$_2$O$_3$ | Dried Product Analysis % Fe$_2$O$_3$ |
|---|---|---|---|---|---|---|---|---|---|---|---|
| Run 1, 16 | 7 | 1.7 | 0.16 | 1 | 1.7 | 0.16 | 0 | — | — | — | — |
| Run 35 | 5.3 | 4.1 | 0.39 | 1 | 0.35 | 0.033 | 91 | 94.1 | 1.60 | 40 | 2.2 |
| Run 36 | 5.2 | 3.2 | 0.31 | 1 | 0.25 | 0.024 | 91 | — | — | — | — |
| Run 36 | 5.3 | 3.2 | 0.31 | 2 | 0.26 | 0.025 | 91 | 94.1 | 0.8 | 400 | 3.9 |
| Run 36 | 10.4 | 6.7 | 0.61 | 1 | 0.22 | 0.021 | 63 | — | — | — | — |
| Run 36 | 10.9 | 6.7 | 0.61 | 2 | 0.21 | 0.019 | 64 | 94.6 | 1.6 | 400 | 4.4 |
| Run 36 | 15.7 | 10.3 | 0.89 | 1 | 9.6 | 0.83 | ca. 6 | — | — | — | — |
| Run 36 | 15.7 | 10.3 | 0.89 | 2 | 10.3 | 0.89 | 0 | — | — | — | — |
| Run 43 | 5.0 | 3.5 | 0.33 | 1 | 0.26 | 0.025 | 95 | 94.6 | 1.0 | 0.08 | 2.1 |
| Run 45 | 5.1 | 2.8 | 0.26 | 1 | 0.25 | 0.023 | 89 | 67.8 | (1) | (1) | — |

(1) SiO$_2$ and Al$_2$O$_3$ mass balance discrepancy.

I claim:

1. A hydrometallurgical process for producing solid beryllium hydroxide from an ore containing a beryllium silicate mineral, which comprises:
   (a) leaching the ore by simultaneously contacting with effective amounts of a concentrated caustic solution and lime or lime hydrate, with agitation in a closed reactor at elevated temperature and autogenous pressure, until a slurry is formed containing dissolved beryllium hydroxide and by-product solids comprising waste gangue and calcium-sodium silicates;
   (b) reducing the pressure to about one atmosphere and maintaining the temperature below the boiling point of the caustic solution;
   (c) separating the by-product solids from the slurry to leave a pregnant leach liquor;
   (d) diluting and heating the pregnant leach liquor to precipitate the beryllium hydroxide and to leave a mother liquor containing caustic; and
   (e) separating the beryllium hydroxide.

2. The process of claim 1 wherein the temperature in step (a) is at least 200° C.

3. The process of claim 1 wherein the temperature in step (a) is in the range of from about 200° C. to about 300° C.

4. The process of claim 1 wherein the temperature in step (b) is maintained at about 80°–120° C.

5. The process of claim 1 wherein the concentration of the caustic solution in step (a) is at least 40% by weight and the pregnant leach liquor is diluted in step (d) to a sodium hydroxide concentration of about 2–12% by weight.

6. The process of claim 5 wherein the pregnant leach liquor is diluted in step (d) to a caustic concentration of about 4–10% by weight.

7. The process of claim 1 wherein the ratio by weight in step (a) of caustic to beryllium as BeO in the beryllium silicate ore is about 5:1 to 30:1.

8. The process of claim 1 wherein the contact time in step (a) is effective to dissolve a substantial portion of the mineral and to yield a slurry sufficiently concentrated in dissolved beryllium hydroxide such that precipitation thereof occurs in step (d).

9. The process of claim 1 wherein the ore comprises a concentrate containing from about 6% to about 40% by weight beryllium silicate ore as BeO.

10. The process of claim 9 wherein the ore comprises phenacite.

11. The process of claim 9 wherein the ore comprises beryl.

12. The process of claim 9 wherein the ore comprises bertrandite.

13. The process of claim 1 wherein the ore additionally contains aluminum compounds, and lime or lime hydrate is added to the mother liquor resulting from step (d) to precipitate said aluminum compounds.

14. The process of claim 1 wherein the ore comprises phenacite, a leach feed to the reactor in step (a) is prepared by slurrying lime or lime hydrate and the ore into the concentrated caustic solution, the temperature in step (a) is in the range of from about 200° C. to about 300° C., the temperature in step (b) is maintained at about 80°–120° C., and the leach liquor is diluted in step (d) to a caustic concentration of about 2–12% by weight.

15. The process of claim 1 wherein mother liquor from step (d) is reconcentrated in caustic and recycled to step (a).

16. The process of claim 1 wherein the leach liquor in step (d) is heated to 90°–100° C.

17. The process of claim 14 wherein mother liquor from step (d) is reconcentrated in caustic and recycled to step (a).

18. The process of claim 1 wherein the ore additionally contains silica, and wherein the concentration of the caustic solution in step (a) is at least 40% by weight, the ratio by weight in step (a) of caustic to beryllium as BeO in the beryllium silicate ore is about 5:1 to 30:1, and the mole ratio of lime or lime hydrate to silica is at least about 1:1.

* * * * *

UNITED STATES PATENT AND TRADEMARK OFFICE
CERTIFICATE OF CORRECTION

PATENT NO. : 4,729,881

DATED : March 8, 1988

INVENTOR(S) : William C. Copenhafer

It is certified that error appears in the above-identified patent and that said Letters Patent is hereby corrected as shown below:

Page 1, line 3 of Abstract, "of-" should read --of--;
Column 4, line 34, "8Na(OH) (aq)" should read --8 NaOH(aq)--;
Column 12, line 3, "caustic BeO" should read --caustic:BeO--;
line 21, "NaOH BeO" should read --NaOH:BeO--.

Signed and Sealed this

Fourth Day of October, 1988

Attest:

DONALD J. QUIGG

Attesting Officer     Commissioner of Patents and Trademarks